United States Patent
Schoenborn et al.

(10) Patent No.: US 12,427,660 B2
(45) Date of Patent: Sep. 30, 2025

(54) METHOD AND SYSTEM FOR TRAINING A ROBOT

(71) Applicant: ABB Schweiz AG, Baden (CH)

(72) Inventors: Sandro Schoenborn, Basel (CH); Andrei Dan, Otelfingen (CH); Robert René Maria Birke, Morgex (IT); Philipp Sommer, Zürich (CH); Thomas Locher, Zürich (CH)

(73) Assignee: ABB Schweiz, Baden (CH)

( * ) Notice: Subject to any disclaimer, the term of this patent is extended or adjusted under 35 U.S.C. 154(b) by 325 days.

(21) Appl. No.: 18/042,490

(22) PCT Filed: Aug. 12, 2021

(86) PCT No.: PCT/EP2021/072506
§ 371 (c)(1),
(2) Date: Feb. 22, 2023

(87) PCT Pub. No.: WO2022/043083
PCT Pub. Date: Mar. 3, 2022

(65) Prior Publication Data
US 2023/0330847 A1    Oct. 19, 2023

(30) Foreign Application Priority Data
Aug. 24, 2020 (EP) .................................. 20192468

(51) Int. Cl.
*B25J 9/16* (2006.01)
(52) U.S. Cl.
CPC ............. *B25J 9/163* (2013.01); *B25J 9/1697* (2013.01)

(58) Field of Classification Search
CPC ......... B25J 9/163; B25J 9/1697; B25J 9/1656
USPC ................. 700/245–264; 318/568.11–568.25
See application file for complete search history.

(56) References Cited

U.S. PATENT DOCUMENTS

| | | | |
|---|---|---|---|
| 9,050,719 B2* | 6/2015 | Valpola | B25J 13/085 |
| 9,669,543 B1* | 6/2017 | Stubbs | B25J 9/1612 |
| 10,099,369 B2* | 10/2018 | Kopicki | B25J 9/163 |
| 10,281,994 B2 | 5/2019 | Sayah | |
| 10,576,635 B2* | 3/2020 | Ogawa | B25J 19/023 |
| 10,919,152 B1* | 2/2021 | Kalouche | B25J 9/1697 |
| 11,034,018 B2* | 6/2021 | Kusano | G06N 3/04 |
| 11,312,581 B2* | 4/2022 | Huang | B25J 9/163 |
| 11,400,598 B2* | 8/2022 | Tomioka | B25J 9/1697 |
| 11,839,986 B2* | 12/2023 | Hallock | G06T 7/246 |

(Continued)

OTHER PUBLICATIONS

Kronander, Klas, et al.; "Learning Compliant Manipulation through Kinesthetic and Tactile Human-Robot Interaction"; IEEE Transactions on Haptics, vol. 7, No. 3; IEEE, USA; Jul. 1, 2014; 14 Pages.

(Continued)

*Primary Examiner* — Jaime Figueroa
(74) *Attorney, Agent, or Firm* — Whitmyer IP Group LLC

(57) ABSTRACT

A method and system are provided for training a robot to recognize objects in the workspace of the robot. Objects in the workspace are identified by the user, and the robot determines candidate objects. Feedback may be used in order for the user to confirm whether the candidate object determined by the robot system matches the object intended by the user. Gripping information for the object may also be identified by the user to train the robot how to grip the object.

19 Claims, 3 Drawing Sheets

(56) References Cited

U.S. PATENT DOCUMENTS

| | | | | |
|---|---|---|---|---|
| 2013/0151007 | A1* | 6/2013 | Valpola | B25J 13/08 |
| | | | | 901/9 |
| 2013/0346348 | A1* | 12/2013 | Buehler | G05B 19/423 |
| | | | | 901/31 |
| 2016/0101519 | A1* | 4/2016 | Kopicki | B25J 9/1697 |
| | | | | 700/254 |
| 2016/0257000 | A1* | 9/2016 | Guerin | B25J 9/1671 |
| 2017/0051926 | A1* | 2/2017 | Viswanathan | F24F 5/00 |
| 2018/0272535 | A1* | 9/2018 | Ogawa | B25J 13/085 |
| 2018/0281201 | A1* | 10/2018 | Rosenstein | B25J 15/12 |
| 2018/0311818 | A1* | 11/2018 | Chipalkatty | B25J 9/1656 |
| 2018/0319015 | A1* | 11/2018 | Sinyavskiy | G05D 1/0088 |
| 2019/0366539 | A1* | 12/2019 | Arisoy | B25J 9/1612 |
| 2020/0061838 | A1* | 2/2020 | Amacker | B25J 9/1697 |
| 2020/0089400 | A1* | 3/2020 | Zarraga | G06F 3/04144 |
| 2020/0094406 | A1* | 3/2020 | Kusano | B25J 9/1669 |
| 2020/0206918 | A1* | 7/2020 | Sun | G06N 99/00 |
| 2020/0215685 | A1* | 7/2020 | Jamali | B25J 9/1697 |
| 2020/0331709 | A1* | 10/2020 | Huang | B65G 47/905 |
| 2021/0122053 | A1* | 4/2021 | Hallock | H04N 23/54 |
| 2021/0347059 | A1* | 11/2021 | Zhang | G05D 1/0274 |
| 2022/0245849 | A1* | 8/2022 | Safronov | G06V 10/774 |

OTHER PUBLICATIONS

Extended European Search Report; Application No. 20192468.5; Completed: Feb. 5, 2021; Issued: Feb. 16, 2021; 11 Pages.
International Search Report and Written Opinion of the International Searching Authority; Application No. 20192468.5; Completed: Oct. 5, 2021; Mailing Date: Oct. 13, 2021; 19 Pages.

* cited by examiner

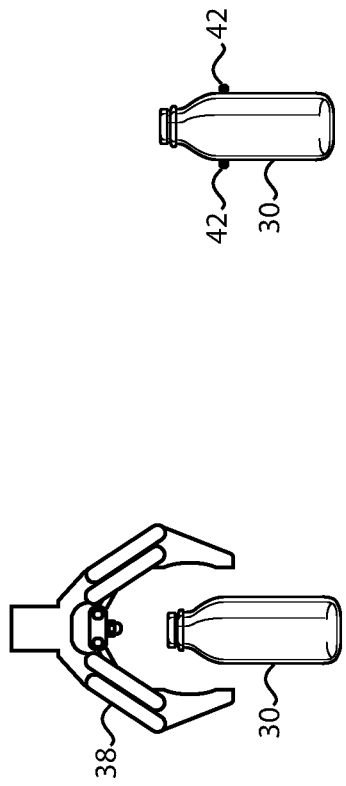

Indicating how to grip an object by
- Using a special pointing device with optically similar shape and dimensions as the original robot gripping tool ("wand")
- Holding fingers in a gesture to imitate the robot's gripper Holding the device/fingers in space defines the gripping position of the robot's tool
- Gripping position consists of contact points between gripper and object and the relative orientation of the gripper with respect to the object
- Wand location and orientation is tracked by camera system

FIG. 3

METHOD AND SYSTEM FOR TRAINING A ROBOT

TECHNICAL FIELD

The present inventions relate generally to robots, and more particularly, to defining objects in a workspace and gripping locations on the objects.

BACKGROUND

Object interaction, such as picking and manipulation, lies at the core of most robot tasks. In operation, the robot needs to know where to find an object of interest and how to handle the object, e.g., where and how to grip it. Traditional robot programming is done by experts using specialized programming languages and operating systems. These tools require an in-depth understanding of the robot and its capabilities. Thus, in conventional robot programming, it is an expert's task to define the object's location and/or gripping information, often in the form of coordinates in the robot workspace relative to the robot.

Although object definition for a robot and programming the interaction between the robot's gripper and the object is essential for using a robot, such tasks are time consuming and often require expert knowledge. Many robot tasks involve object grasping and some physical operation with the object, e.g., placing and/or manipulation of the object. However, robots are controlled through low-level commands, typically in a specific and specialized programming language. Such robot programming languages are generally designed for expert-level users.

Thus, improved methods and systems for defining workspace objects and gripping locations thereon would be useful.

SUMMARY

A method and system are described for training robot systems to recognize objects and gripping information for objects in a workspace. Objects may be identified by a user using a touchscreen, using gestures in the workspace or using language-based inputs. Feedback may be used to confirm that the robot system has recognized the object that the user intended to select. The user may also train the robot system to recognize gripping information that the user intends the robot to use when gripping a recognized object. The invention may also include any other aspect described below in the written description or in the attached drawings and any combinations thereof.

Also, a system configured for training a robot system by a user according to any method described herein is provided. The system comprises a determining module configured for determining a candidate object by the robot system within a workspace of a robot; a display module configured for displaying the candidate object to the user; and and identity learning module configured for receiving an identifying input by the user, the input being indicative of whether the candidate object matches an intended object. Also, a use of the system for training a robot system by a user according to any method described herein is provided.

BRIEF DESCRIPTION OF THE DRAWINGS

The invention may be more fully understood by reading the following description in conjunction with the drawings, in which:

FIG. 3 is a diagram showing gripping locations being identified.

DETAILED DESCRIPTION

Figure 1:
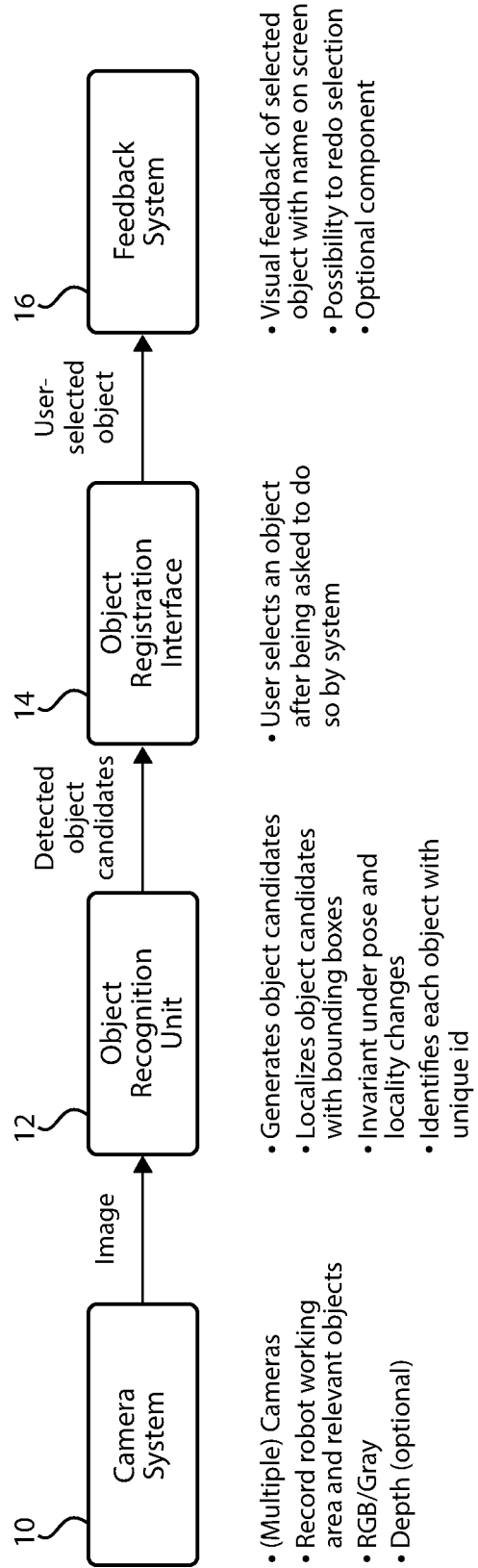
FIG. 1 is a diagram of components of a robot training system.

The improved method and system herein enables intuitive human-robot interaction for defining objects and their gripping points. Defining new objects and gripping locations is crucial to flexibly configure robots for new tasks. The described method and system is based on vision mechanisms and uses improved interaction modes for object teaching and gripping information definition. Thus, the method and system enables non-experts to perform these parts of robot programming without requiring the user to write software code in a specialized robot programming language. Instead, the user may intuitively interact with a collaborative robot to accomplish such tasks. Simplifying object definition enables the adoption of robotic automation for high-mix low-volume applications where high customizability requires frequent reconfiguration of the robot tasks. Newer systems based on fully automated machine learning techniques (e.g., Dex-net) may provide automatic information definition, but such approaches do not guarantee successfully identifying gripping information for an object. Therefore, improved solutions are needed to define workspace objects and gripping information.

The improved methods and systems enable non-expert users to quickly define new objects, define gripping information for unknown objects and more generally define the key locations and actions of a robot's gripper. The mode of interaction for object information definition is based on the robot's vision system and alternative modes of user interaction. User interaction may be partly based on gestures and may include a special physical device, referred to as a "wand", which resembles typical grippers physically and visually. By mimicking the robot gripper, the wand provides an intuitive analogous interface which is easy for the user to understand. If a gripper with significantly different characteristics from the wand is mounted on the robot, e.g., with three or more fingers instead of two fingers on the wand, the system can translate the gripping points that the wand identifies for the specific characteristics of the robot's gripper. The wand may be led by the hand of a non-expert robot programmer in place of the actual robot's gripper. This mode of interaction allows the user to define locations, designate objects and define the required gripping information by handling the wand in a similar way as the robot would use the actual gripper attached to the robot. The wand may be tracked and its position and orientation in space evaluated by the visual system of the robot or an internal inertial measurement unit (IMU) within the wand. The wand may also be used to define additional properties, such as the gripping force to be exerted on the object. In general, the wand may model any type of robot gripper (e.g., a photo camera for automatic quality inspection, welding tool or a screwdriver).

The method and system uses a primary vision-based system for object detection and localization. A wand may be used in some embodiments for object detection and localization. A touch display may be used for some of the interaction modes, which enables a close feedback loop with the user to define objects on-screen, and/or enables quick correction of erroneously detected objects and defined object information by simply affirming or canceling directly on the screen. Additionally, the wand may contain buttons or touch sensitivity for easier interaction with the user.

The improved method and system provides interactive teaching to a robot of the identity and gripping information of objects. Two primary subsystems are provided, one subsystem includes object identity learning and one subsystem includes teaching object gripping information. Both subsystems may share some of the same components to implement their functionality and may be complemented by a common feedback module. The described modules may also be used in isolation but it is preferred that the two modules be used together to provide the best performance.

The system may use a number of different components depending on the specific mode of interaction desired (e.g., speech modules for language-based object definition). As shown in FIG. 1, such components may include a robot camera system 10, an object recognition unit 12, an object registration interface 14, a visual feedback system 16 (e.g., used for touch interaction and a feedback system), a gesture recognition unit 20 (FIG. 2) (e.g., used for finger-based gripping point definition) and interaction tools, such as a special gripper-like device wand 38 (although an alternative may be to use the user's fingers 36 to form a gripping gesture).

Object learning may be based upon a two-stage visual approach. First, the object recognition module finds possible object candidates using generic object detection algorithms. The object candidates may be localized with a bounding-box and may be internally uniquely identifiable. The object recognition module is preferably practically invariant under object translation and orientation changes such that object candidates are reliably re-found in the working space. That is, the object recognition module is able to correctly identify an object regardless of its location or orientation in the workspace. Illumination condition changes are preferably handled to an extent which is practically relevant across the working area of the robot. The object candidates may be characterized with common visual attributes, such as a common object class (e.g. "bottle"), color ("yellow"), surface finish (e.g. "shiny") and relative sizes.

Figure 2:
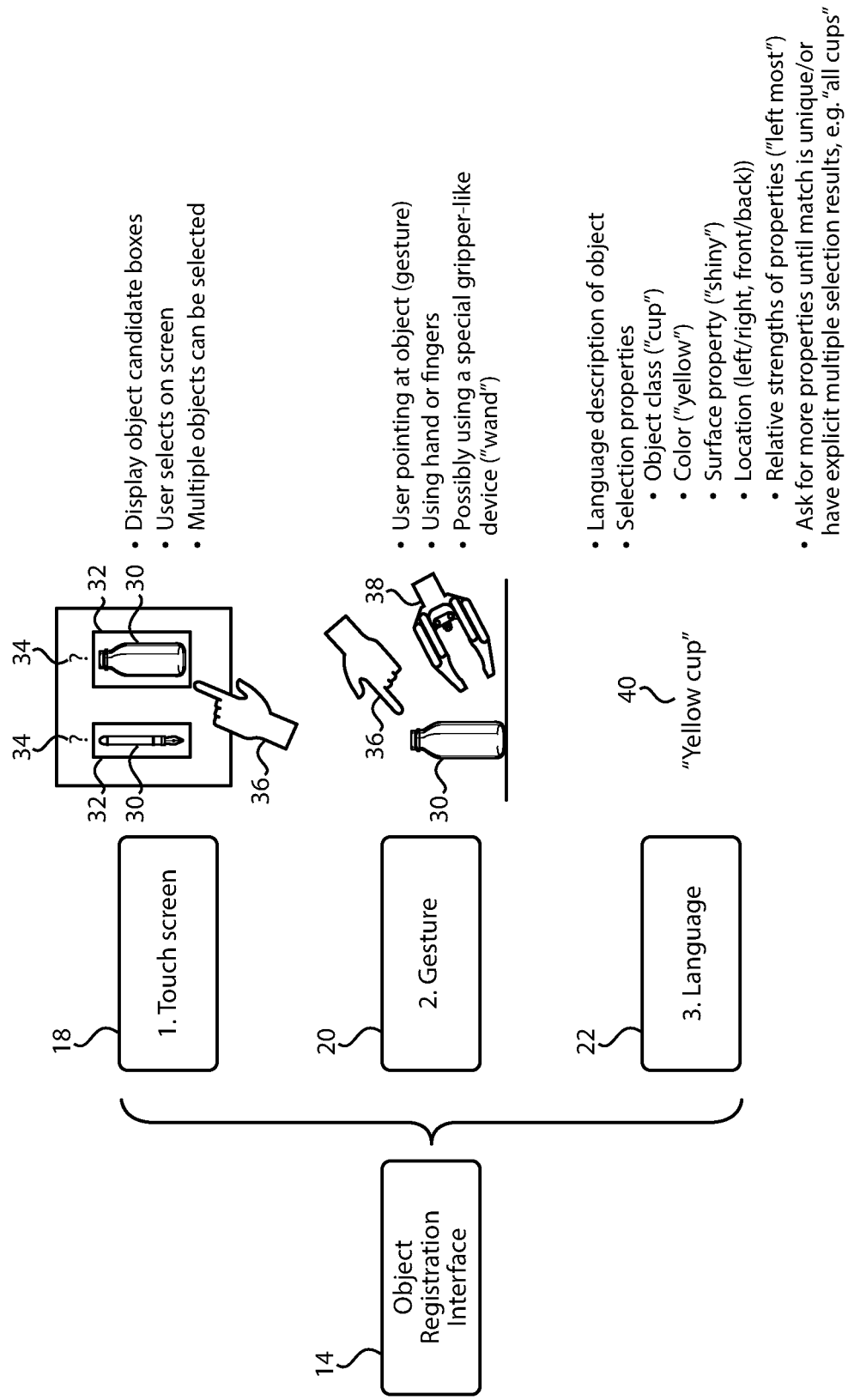
FIG. 2 is a diagram of the object registration module.

Object teaching then involves assigning names to the object candidates to enable full object detection and identification for further interaction in the robot task. Assigning names to the object candidates may occur through interaction with the user. If the system needs input about the location, orientation and gripping information of a specifically named object (e.g., after the user asks the robot to perform an action with the specified object), the user may be asked to designate the object in one of three ways as shown in FIG. 2: 1) by selection on a touch screen; 2) by using a physical gesture with the wand or the user's fingers; or 3) by a language description. Object learning may lead to an individual object name or naming a whole category of objects which leads to the possibility of working with many such objects, e.g. one specific pen vs. all pens. In the touch interaction mode 18, the system may display the robot camera image with candidate objects 30 indicated to the user. In FIG. 2, the candidate objects 30 include a pen and a bottle but could be any type of object. The candidate objects 30 may be preselected by the system (e.g., by highlighting 32 the candidate objects 30 or with boundary boxes 32 around the candidate objects 30). The user may then select the intended object 30 by touching it on the touch screen display 18. Touch interaction may also allow for multiple selections using multi-touch selection, either with a selection mode switch or by drawing a selection box. In the gesture mode 20, the user points at the object 30 to be selected using the user's finger or hand 36 or the wand 38 within the workspace in the field of view of the robot camera. The system interprets the gesture by extending the pointing direction to the objects in the workspace and selecting the object closest to the intersection of pointing ray. If there is no object within a predefined maximal allowable distance from the intersection point, the gesture may be ignored by the system. In the language-based definition mode 22, the user defines the object using one or more words 40 in natural language. The language definition involves the user specifying one or more attributes of the object candidate with a word 40, e.g. "yellow bottle". The attributes may include color, object class, surface finish, (relative) location ("front left"), orientation ("facing right"), (relative) size ("smallest"), etc. The module may provide feedback immediately about the matching candidates on the screen or by text-to-speech output. The user may either explicitly accept multi-objects for selection by a predefined key word trigger (e.g. "all yellow bottles") or the system may continue to ask for more attributes until a unique selection is achieved. In the specification process, the system may keep and use contextual information about already specified properties.

Learned objects may be fed back to the user by displaying named objects on the screen, possibly with colored bounding boxes. This may be part of the feedback system described below. The object teaching system may be used to define locations as well. Locations are not tied to moveable objects but are spatially fixed locations in the workspace, e.g. "right front corner". This process may be especially suited to using the wand to point a location in the workspace.

In order to successfully pick up and manipulate an object by the robot, the user preferably also teaches the robot information about object gripping. As shown in FIG. 3, object gripping information includes at least the position of points 42 to be grabbed with the robot gripper tool and the relative orientation of the gripper tool with respect to the object. Gripping information may also be characterized in other equivalent ways, e.g., by specifying the axis of gripping and the relative rotation of the tool around the gripping axis. Gripping information may be defined by 1) using the wand 38 as a designation tool or by 2) the user's fingers 36 mimicking the robot gripper.

The wand may be a special tool which is built to physically and visually resemble a standard robot gripper. Unlike the actual robot gripper, the wand is not attached to the robot and is a loose, unattached component. The wand may be held by the user's hand easily. The user holds the wand such that it mimics the position and orientation of the original robot gripper. The wand tool is easier to handle for the user than leading the actual robot gripper together with the robot's arm ("lead-through"). The wand's position and orientation in space are used to derive the desired gripping information such that the actual robot gripper approaches the object in the same spatial location and orientation at which the wand was held when defining the gripping information. As noted above, due to possible different characteristics between the wand and the actual gripper, the gripping information may be adjusted to suit the particular actual gripper used on the robot. The wand's location and orientation may be externally tracked by the visual system. Alternatively, the wand may derive its location and orientation through internal means of tracking, e.g. through an IMU (inertial measurement unit) and communicates it back to the system. A user interface on the wand may also include buttons or touch sensitive surfaces.

The user may also provide gripping information by mimicking the robot gripper with the user's hand. This may be a gesture involving the index finger and thumb forming the shape of a gripper. The position of the fingers and orientation of the hand may be visually tracked using the gesture recognition system. Alternatively, a gesture may be tracked via specific body sensors, such as a glove or wristband equipped with an IMU. Gripping information may be derived and calculated so that the robot approaches the object with its gripping tool at the touching points of the fingers and the object and replicates the relative orientation of the hand with respect to the object/gripping axis.

The wand enables the user to intuitively and naturally define gripping information by analogy gestures. Since the wand physically resembles the gripping tool, e.g. similar physical dimensions, the wand allows the user to intuitively understand the physical constraints of gripping, e.g. maximal opening of the gripper arms or physical unreachability of certain positions due to spatial object constraints (non-convex object shapes, unreachable parts, points close to the working table, etc.).

The system for defining gripping information may also be used as a fallback module for fully automatic gripping information determinations using modern AI solutions, such as e.g., Dex-net. Automatic methods fail occasionally, e.g., in the case of a heterogeneous mass distribution in the object, and in such situations the user is still required to define gripping information manually.

Depending on the particular use, the wand may include additional functionality that enables intuitive robot programming. For example, the wand may implement advanced measurements, such as touching force, which is then communicated wirelessly together with the gripping position to the robot. This enables the system to define more detailed gripping information, including gripping force, in addition to the gripping position. Where the robot arm is used to position a camera in a position to take photos, e.g. for inspection, the wand may project the field of view of the camera onto the object to be inspected to facilitate the definition of the poses for the robot arm.

The feedback system may display information about the defined objects and gripping information visually on a display. As shown in FIG. 2, defined objects may be shown with their names 34 (or a question mark where the name 34 has not yet been assigned) and different objects/object classes may be highlighted using different colors. Displaying multiple objects belonging to the same selection using the same color allows the user to quickly identify object groups. The objects may be displayed in overlay on the camera image which allows the user to view the full context of all objects. The gripping information may also be displayed as well by drawing gripping points or an axis and orientation on the display screen.

A touch screen display may allow the user to interact and redefine necessary information in several ways. For example, a long touch press on a named object may put the system in correction mode with the following follow-up actions: touch and swipe on an object could delete the association of name and object; and short touching the object again can restart object teaching for the specified name. Thus, the correction mode removes the current association of the name and object and may immediately start the object teaching again with the same name.

The system may also be implemented using additional visualization channels. For example, visualization may use the same elements describe above but be rendered in 3D space and may also be displayed using virtual reality gear. Using augmented reality gear may replace touch interaction and highlighted names and gripping information may be directly overlaid on the object in virtual reality.

The feedback system may also be used to display possible satisfiability violations to the user. For example, the defined gripping points may be unreachable for the robot, e.g. due to motion conflicts with the work table or the object itself (if 3D shape is known). In such cases, the display of the gripping information may indicate this condition by, e.g., red coloring of the gripping point and additional textual or symbolic indication. Also, speech-to-text output may be used to communicate these conditions to the user.

Display of gripping point information may also include accuracy information. The uncertainty of gripping points may involve inaccuracy due to camera calibration, wand tracking, robot position precision (if known). The system may use probabilistic inference techniques (e.g., Markov chain Monte Carlo methods) to combine all sources of uncertainty and display the resulting inaccuracy of gripping with a numerical percentage or a colored semi-transparent cloud around the defined point. This information may provide immediate valuable information to the user and may cause the user to redefine the points or fix other sources of uncertainties.

As described, the method of training a robot system by a user may include determining a candidate object 30 by the robot system within a workspace of a robot. The candidate object 30 may then be displayed to the user. By viewing the display, the user may then identify to the robot system whether the candidate object 30 matches the intended object 30.

The method may also include assigning a name 34 to the candidate object 30 by the user. The name 34 and image data of the candidate object 30 may be stored in memory of the robot system so that it may be accessed in the future when similar candidate objects 30 are selected. Thus, for future candidate objects 30 the memory may be cross-referenced with the image data of the stored candidate object 30 and the future candidate object 30. Where a corresponding match is found between the image data, the stored name for the object 30 may be displayed on the screen next to the object 30. Similarly, when a user identifies an object 30 with a name that is stored in the memory, the system may access and display any data previously stored and associated with that name, such as different image views, gripping information, class groups, etc.

The method may also include displaying the candidate object 30 with highlighting or a boundary line 32 around the candidate object 30 on the display screen 18. This may be done at various points in the training method. For example, the robot system may preselect objects 30 with highlighting or bounding, or objects 30 may be highlighted or bounded in response to selections made by the user, either by direct selection by the user on the screen 18, in response to the user identifying objects 30 in the workspace by gesturing, or through language identification.

The method may also include the user identifying a region in the workspace with an intended object 30. The robot system may then determine one or more candidate objects 30 within the region as objects 30 that likely correspond to the object 30 intended by the user. The candidate objects 30 may then be displayed and the user may confirm or deny that the correct object has been selected by the system.

The method may also include displaying the candidate object 30 within an image of the workspace on the touch screen 18. The user may then identify which object 30 is intended by touching the touch screen 18 to select the object 30.

The method may also include identifying the intended object 30 by the user gesturing 20 within the workspace. The gesturing 20 may include either the user positioning a hand or finger 36 within the workspace or positioning a wand 38 within the workspace. The robot system may then determine the location and/or orientation of the hand or finger 36 or wand 38 to determine which object 30 to select. Where the user's hand or finger 36 is used to gesture within the workspace, it is preferable for the robot system to visually track the location and/or orientation of the hand or finger 36.

The method may also include the wand 38 being physically unattached to the robot system so that the wand 38 is freely movable by the user both within the workspace and outside the workspace. In one embodiment, the wand 38 may not contain any electronics and may be merely a mechanical representation of the actual robot gripper. In such case, the robot system may visually track the location and/or orientation of the wand 38 in the workspace. Alternatively, the wand 38 may include an IMU, and the location and/or orientation of the wand 38 may be wirelessly transmitted from the wand 38 to the robot system.

The method may also include the user identifying the intended object 30 with one or more words 40 either vocally or through written text, preferably using natural language.

The method may also include the user identifying the gripping location 42 on the intended object 30 to the robot system. The gripping location 42 may be identified using the touch screen 18, gestures 20 or language 22 as described above. The gripping location 42 may also be stored in memory with the name and image data of each object 30 as described above. The gripping location 42 may also be displayed to the user on the display screen 18 for confirmation or denial of the correct gripping location 42 by the user. The user may also identify the gripping force 42 to the robot system to be applied to the intended object 30. This is preferably done with force sensors on the wand 38 that transmits the force applied by the user to the robot system.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method of training a robot system by a user, comprising:
   determining a candidate object by the robot system within a workspace of a robot;
   displaying the candidate object to the user;
   providing a first identifying input to the robot system, the first identifying input being indicative of whether the candidate object matches an intended object;
   providing a second identifying input to the robot system, the second identifying input being indicative of a gripping location on the intended object; and
   displaying the gripping location, including accuracy information, to the user.

2. The method according to claim 1, further comprising:
   assigning a name to the candidate object by the user;
   storing image data of the candidate object and the name in a memory of the robot system;
   cross-referencing future candidate objects with the image data; and displaying the name with the future candidate objects which correspond to the image data.

3. The method according to claim 1, wherein the candidate object is displayed with highlighting or a boundary line around the candidate object on a display screen.

4. The method according to claim 1, further comprising providing a third identifying input to the robot system, the third identifying input being indicative of a region within the workspace of the robot including the intended object, wherein the robot system determines the candidate object from the region as likely corresponding to the intended object.

5. The method according to claim 1, wherein the candidate object is displayed within an image of the workspace on a touch screen, and the user identifies the intended object by touching the touch screen.

6. The method according to claim 1, wherein the user identifies the intended object by gesturing within the workspace.

7. The method according to claim 6, wherein the gesturing comprises the user positioning a hand or finger within the workspace, the robot system determining a location and/or orientation of the hand or finger to determine the candidate object.

8. The method according to claim 6, wherein the gesturing comprises the user positioning a wand within the workspace, the robot system determining a location and/or orientation of the wand to determine the candidate object.

9. The method according to claim 8, wherein the wand is physically unattached to the robot system.

10. The method according to claim 8, wherein the robot system visually tracks the location and/or orientation of the hand or finger or wand.

11. The method according to claim 8, wherein the wand comprises an IMU and wirelessly transmits the location and/or orientation to the robot system.

12. The method according to claim 1, wherein the user identifies the intended object with a word.

13. The method according to claim 8, further comprising providing a third identifying input to the robot system, the third identifying input being indicative of a gripping force to be applied to the intended object.

14. The method according to claim 2, wherein the candidate object is displayed with highlighting or a boundary line around the candidate object on a display screen.

15. The method according to claim 2, further comprising identifying to the robot system by the user a region within the workspace of the robot including the intended object, wherein the robot system determines the candidate object from the region as likely corresponding to the intended object.

16. The method according to claim 2, wherein the candidate object is displayed within an image of the workspace on a touch screen, and the user identifies the intended object by touching the touch screen.

17. The method according to claim 2, wherein the user identifies the intended object by gesturing within the workspace.

18. The method according to claim 7, wherein the robot system visually tracks the location and/or orientation of the hand or finger.

19. The method according to claim 1, further comprising:
    in response to receiving confirmation that the gripping location is correct, training the robot system to recognize the gripping location for use when gripping the candidate object.

* * * * *